United States Patent [19]
Borzym

[11] Patent Number: 5,125,306
[45] Date of Patent: Jun. 30, 1992

[54] ECCENTRIC OVERLOAD ASSEMBLY WITH A DECAYING FORCE

[76] Inventor: John Borzym, 4820 School Bell La., Birmingham, Mich. 48010

[21] Appl. No.: 618,693

[22] Filed: Nov. 27, 1990

[51] Int. Cl.⁵ .................... B23D 21/00; B26D 7/02
[52] U.S. Cl. ........................................ 83/319; 83/386; 83/388; 83/456; 83/460; 269/235
[58] Field of Search ................ 83/54, 318, 319, 320, 83/385, 386, 388, 389, 390, 459, 460, 463, 862, 72, 456; 269/234, 235, 229, 157, 196

[56] References Cited

U.S. PATENT DOCUMENTS

| | | | |
|---|---|---|---|
| 4,108,029 | 8/1978 | Borzym | 83/54 |
| 4,294,147 | 10/1981 | Borzym | 83/382 |
| 4,848,723 | 7/1989 | Borzym | 83/319 X |

Primary Examiner—Douglas D. Watts
Assistant Examiner—Eugenia A. Jones
Attorney, Agent, or Firm—Dykema Gossett

[57] ABSTRACT

An overload assembly is disclosed for use with a tube cutting apparatus of the type having a die set for holding a tube while a blade cuts the tube. The die set comprises two die jaws having cam followers which contact a die jaw cam to move the die jaws to clamp the tube. The overload assembly allows one of the die jaws of the die set to stop moving when an obstruction is encountered. The overload assembly includes a spring mounted through a lever arm to the cam follower. An overload biasing force is applied to the cam follower through the lever arm. If an obstruction force exceeds the overload biasing force, the lever arm is rotated and the effective length of the lever arm is reduced, causing the overload biasing force to decay to a lesser value. A scarfing blade may initially score the tube prior to cutting. In one embodiment, the overload biasing force is applied to the die jaw which does not encounter a binding force between the scarfing blade and the tube.

23 Claims, 4 Drawing Sheets

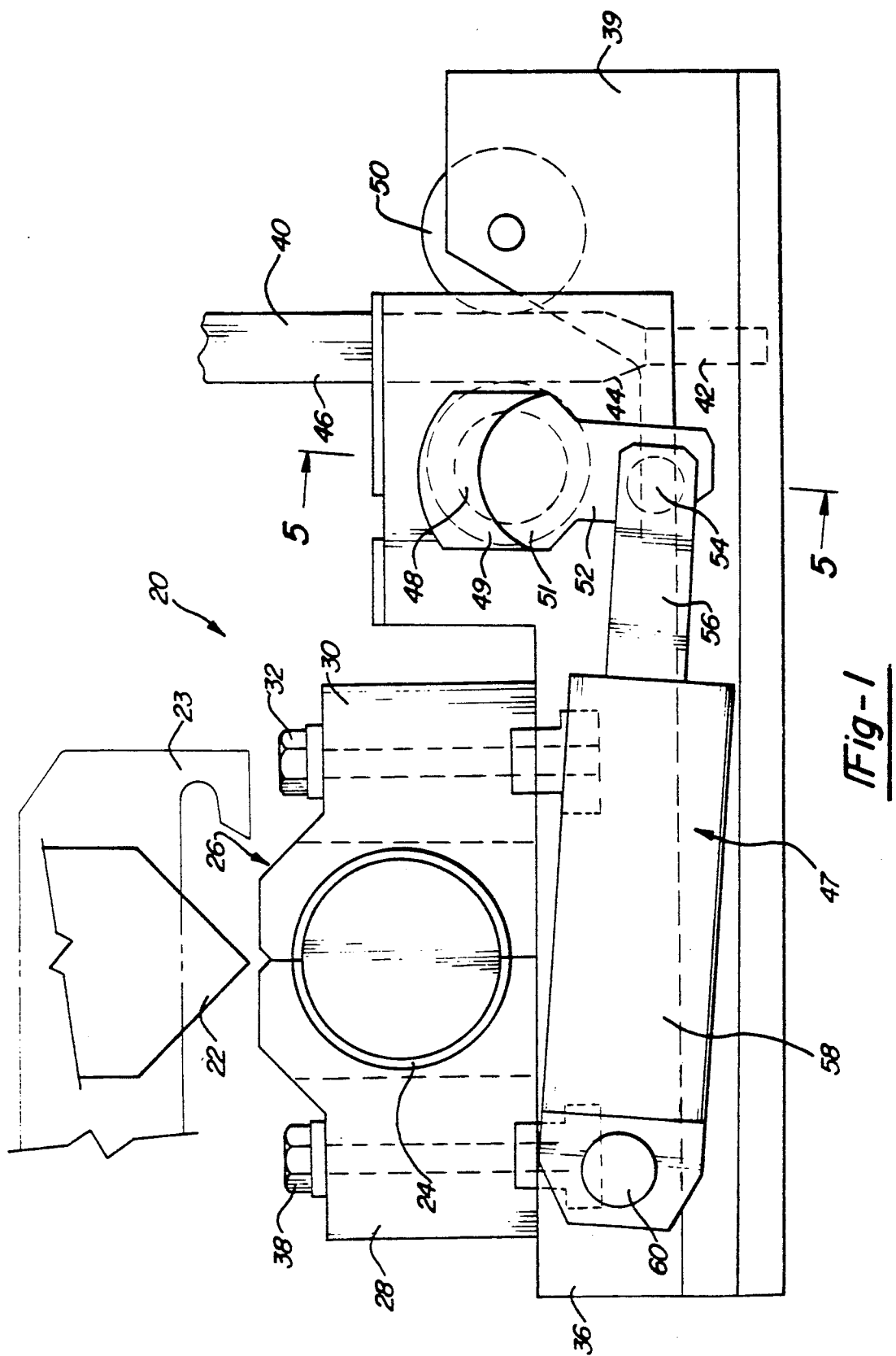

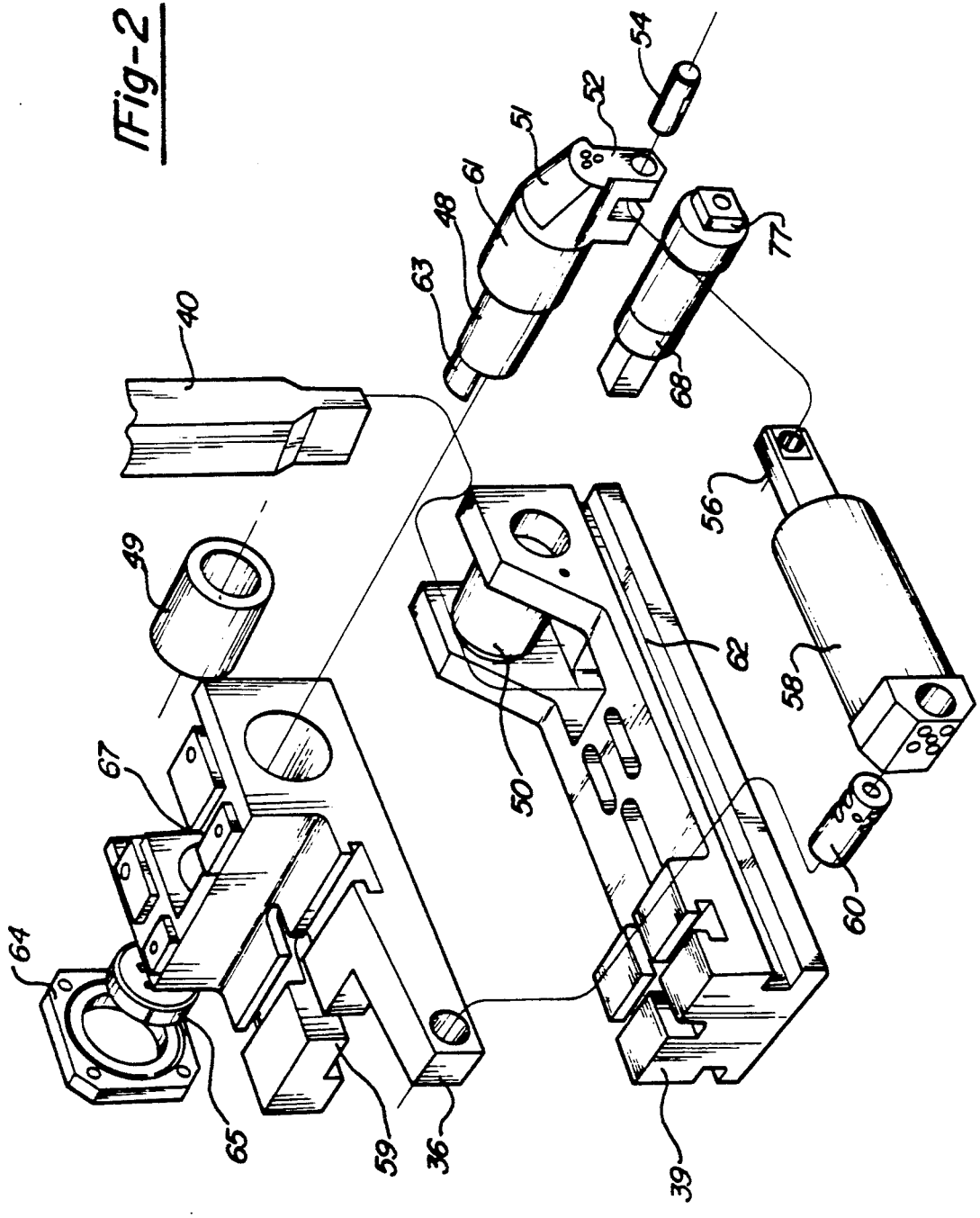

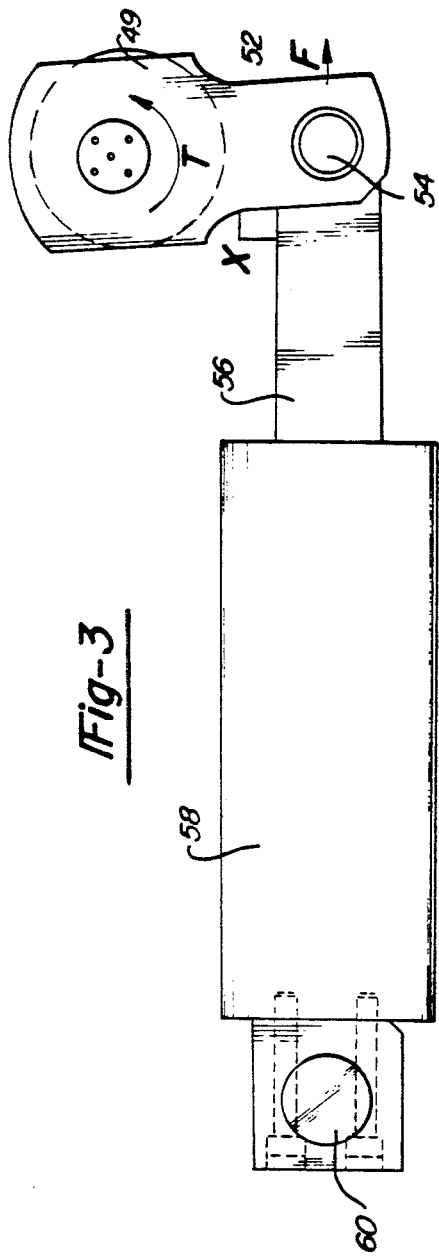
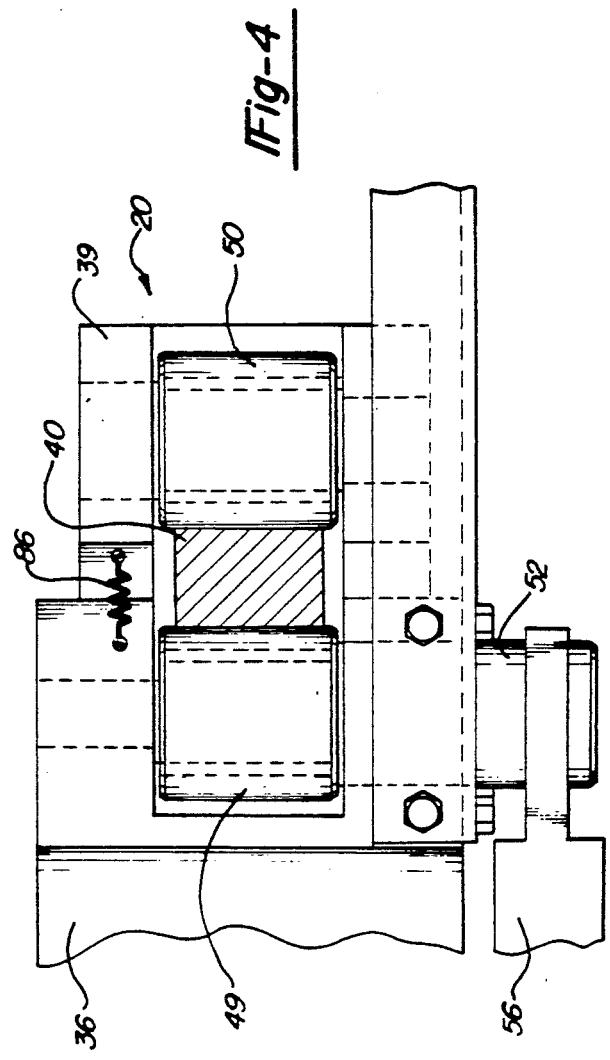

5,125,306

ECCENTRIC OVERLOAD ASSEMBLY WITH A DECAYING FORCE

BACKGROUND OF THE INVENTION

This invention relates to a tube clamping assembly used in a tube cutting apparatus. More particularly, it relates to an improved clamping overload assembly to prevent overly high forces on a clamp die set.

Tube cutting apparatus are well known in the prior art and typically include a cutting blade member and a die set having die jaws for clamping and holding a tube member while the cutting blade member cuts the tube. In some tube cutting apparatus a scarfing blade scores the tube to provide an initial cut for the cutting blade. These apparatuses are relatively complex since the tube is clamped and cut as it exits a mill, with the blades, the die set and the tube all moving in conjunction with one another at the same speed.

Various methods are used to ensure proper timing between the clamping of the tube by the die set, the scoring of the tube by the scarfing blade and the cutting of the tube by the cutting blade. In one known methods, a mechanical die jaw clamping cam is utilized with two slide members, each of which mount at least one die jaw of a die set, and each of which have cam followers in contact with the die jaw cam. Each slide member may mount a pair of axially spaced die jaws, and although the singular term die jaw may be used in this application, it should be understood that a pair of die jaws may actually be used. The die jaw cam is moved and forces the die jaws to engage and clamp the tube in timed actuation with the cutting blade and scarfing blade, if one is used, ensuring a clean cut. The timed sequence may be to clamp, move the scarfing blade to score the tube and then move the cutting blade to cut the tube. During scarfing and cutting the die jaw cam maintains a clamping force holding the die jaws in clamping engagement.

It is important that the die set firmly hold the tube to ensure a clean cut. As the blades cut the tube, large forces are placed on the die jaws in opposition to the clamping force holding them in clamping engagement with the tube. If the die jaws move away from clamping engagement, the tube will often be improperly cut. Thus, in the prior art, the die jaw cam places large clamping forces upon the die jaws to ensure that they maintain clamping engagement with the tube. An example of such a die jaw cam is shown in U.S. Pat. No. 4,108,029 issued to Alexander Borzym. In some systems, the die jaw cam may be forced downwardly by the same press which actuates the cutting blade. Thus, large forces may be placed on the die jaw cam.

An obstruction may be encountered in the path of a slide member or die jaw as it moves into clamping engagement with a tube. When this happens, the movement of the die jaw may be stopped. The die jaw cam will still attempt to move the die jaw and may damage components of the clamping system.

The types of obstructions which may typically be encountered in this environment are chips from previously cut tubes or other debris which might be in the area. Also, a tubing mill upstream of the clamping system may sometimes form tubing of a slightly larger diameter than expected. The cam is designed to clamp tubing of the excepted diameter. Thus, when a tubing section of overly large diameter is clamped by the clamping system an obstruction to the die jaw movement is encountered. The same is true if the tubing is somehow misaligned.

U.S. Pat. No. 4,294,147 issued to John Borzym, discloses an overload biasing assembly that allows a roller associated with one die jaw to slide relative to the die jaw, against an overload biasing force, and accommodate a die jaw cam in the event that an obstruction is encountered. In this device, a mechanical spring biases a cam follower into contact with the die jaw cam. An obstruction force, as could be expected as a die jaw cam attempts to move a die jaw through a path blocked by an obstruction, may be generated on the roller. If the obstruction force exceeds the overload biasing force, the roller moves to accommodate the die jaw cam without associated movement of the die jaw. Once this happens, the die jaw will no longer be moved towards the tube.

The forces normally encountered by the cam follower, even in the absence of an obstruction, are quite large. For this reason, the force on the cam follower in the prior art overload biasing assemblies may have exceeded the overload biasing force, even in the absence of an obstruction. The cam follower would then move to accommodate the die jaw cam, which is undesirable since the tube then may not be adequately clamped, and imperfect cuts may be experienced.

In an attempt to overcome this problem, the prior art used mechanical springs of increased spring force to provide a greater overload biasing force. These large forces could damage the cam follower and thus required correspondingly larger cam followers to withstand the constant stress from the spring, and also required other components to be made stronger and bulkier. To be practical, the prior art devices were eventually designed with numerous bulky linear springs. In one example there are more than ten such springs.

In addition, these linear springs are compressed as the cam follower moves to accommodate the die jaw cam. As this happened the spring force increases greatly and overly large forces are applied to the cam followers, resisting further movement. The overload biasing force provided by a linear spring may be undesirable since it may be preferable to have the cam follower move easily relative to the slide member and accommodate the die jaw cam once an obstruction force in excess of the overload biasing force is experienced.

Further, prior art overload assemblies applied an overload force to the die jaw which could be called the "scarfing blade" slide member. As the scarfing blade moves over the tubing to score and form an initial cut for the cutting blade, it moves over one or both of the two die jaws. Binding between the scarfing blade and the tubing is often encountered, and thus relatively large forces may push or pull on one of the die jaws in opposition to the force holding it in clamping engagement. This die jaw will be defined as a "scarfing blade" die jaw. It may not be practical to leave the tubing unclamped whenever this binding occurs, since it occurs frequently. For this reason it was necessary to have the overload biasing force on the "scarfing blade" slide member be high to compensate for this binding force from the scarfing blade.

Of course, it would be beneficial to eliminate this restriction on the design of the overload biasing force. It would be preferable that the overload biasing force be selected in response to a maximum force desired on the clamping system, rather than having the additional variable of accommodating any binding force created by the scarfing blade.

SUMMARY OF THE INVENTION

A disclosed embodiment of the present invention includes an overload assembly that applies a force to a cam follower that is initially of a first relatively high level, but which decays to lower levels once the force is overcome.

In a disclosed embodiment an overload assembly provides a spring force through a biasing member connected to a lever arm which is fixed to a cam follower. The lever arm provides a mechanical advantage applying a torque, or overload biasing force, on the cam follower. When an obstruction force exceeds the overload biasing force the lever arm rotates and its effective length decreases. The mechanical advantage provided by the lever arm could be said to decay. A relatively high overload biasing force is initially applied to the cam follower, but once an obstruction force does overcome the overload, biasing force, the overload biasing force decays to lower values. Thus, the cam follower may move easily to accommodate the die jaw cam. With such an arrangement, relatively small cam followers may be used, and other components of the clamping system may be scaled down in size.

In a preferred embodiment of the invention, a die set for clamping a tube comprises two opposed die jaw. The die jaws are slidable with respect to each other from a first position at which the die jaws are relatively separated from each other, to a second clamping engaged position, at which the die jaws clamp a tube to be cut. A die jaw cam is provided that acts in concert with a blade for cutting the tube and causes the die jaws to move from the first position to the second position by contacting cam followers associated with each die jaw. The inventive overload assembly provides an overload biasing force on the cam follower of one die jaw to bias the cam follower into the die jaw cam.

Any obstructions encountered by the die jaw as it moved from the first to the second position tends to restrict further movement. The die jaw cam still attempts to move the die jaws, and thus creates an obstruction force applied to the cam follower which may eventually exceed the overload biasing force. If so, the cam follower moves relative to the die jaw to accommodate the die jaw cam, and prevents further movement of the die jaw.

In a most preferred embodiment of the present invention, the cam follower is an eccentrically mounted roller, and the overload biasing force is applied to only one die jaw. It should be understood that other cam followers, such as sliding plates would come within the teachings of this invention.

An included angle is defined between the biasing member and the lever arm. An effective length of the lever arm for purposes of calculating the torque is determined using this included angle. This effective length can be visualized by considering the component of the spring force applied perpendicular to the lever arm, as opposed to the component of the spring force that is applied directly into the lever arm. The component of the spring force applied perpendicular to the lever arm creates an overload biasing force, or torque, at the opposed end of the lever arm which holds the roller against the die jaw cam. When the included angle is approximately 90 degrees the component that is perpendicular to the lever arm is the entire spring force. As the included angle increases towards 180 degrees, the component of the spring force that is perpendicular to the lever arm decreases to zero.

The spring force may be applied perpendicularly to the end of the lever arm to provide the greatest possible effective length of the lever arm. The initial included angle may be tailored to change the effective length and select the initial overload biasing force. Of course, the magnitude of the spring force from the biasing member can also be changed to achieve a desired overload biasing force.

When an obstruction is encountered an obstruction force is created between the die jaw cam, which is attempting to cause the roller to move an additional amount, and the die jaw, which is prevented from sliding by the obstruction. When this obstruction force exceeds the overload biasing force, the roller shaft begins to rotate eccentrically, which causes the lever arm to rotate against the spring force. The roller is mounted so that when the shaft rotates eccentrically, the center of the roller is moved away from the die jaw cam to accommodate it. As the roller and lever arm move, the included angle between the biasing member and the lever arm increases towards 180 degrees. As this happens, the effective length of the lever arm decreases, and the overload biasing force provided through the lever arm decreases. Thus, after the relatively high overload biasing force is initially overcome, the overload biasing force decays to lower values as the lever arm continues to rotate in opposition to the spring force. This allows the roller to move easily to accommodate the die jaw cam, and relative to the die jaw, in the event that an obstruction is encountered which creates an obstruction force exceeding the overload biasing force.

In a further preferred embodiment of the present invention, the tube cutting apparatus includes a scarfing blade and the overload biasing force is applied to the cam follower on the die jaw which is not the "scarfing blade" die jaw as described above. Thus, the overload biasing force must only be designed to consider a desired maximum obstruction force, and need not be selected such that it can accommodate force from binding between the scarfing blade and the tube.

These and other features of the present invention can be best understood from the following specification and drawings, of which the following is brief description.

BRIEF DESCRIPTION OF THE DRAWINGS

FIG. 1 is a side view of a tube cutting apparatus embodying the overload assembly disclosed by the present invention.

FIG. 2 is a partial exploded view of the tube cutting apparatus illustrated in FIG. 1.

FIG. 3 is a partial side view of the overload assembly of the present invention.

FIG. 4 is a partial cross-sectional view showing details of the tube cutting apparatus illustrated in FIG. 1.

DETAILED DESCRIPTION OF A PREFERRED EMBODIMENT

Figure 5:
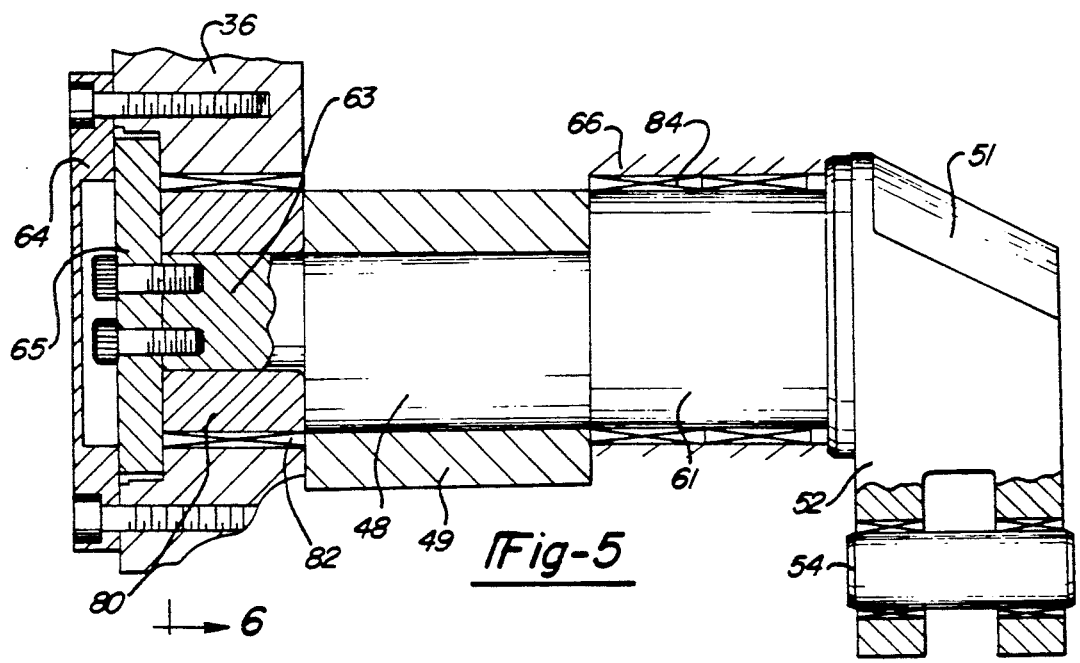
FIG. 5 is a partial cross-sectional view through the overload assembly of the present invention.

An embodiment of the present invention will now be disclosed with reference to FIGS. 1 through 6. As shown in FIG. 1, tube cutting apparatus 20 includes cutting blade 22 and scarfing blade 23, for scoring and cutting tube 24. Die jaw set 26 includes first die jaw 28 and second opposed die jaw 30, which in combination firmly clamp tube 24 for cutting by blades 23 and 22. It should be understood that each die jaw 28 and 30 may include a twin spaced into the plane of FIG. 1.

As known, a cam system may control the timing between the clamping of die jaws 28 and 30 on tube 24, the scoring of tube 24 by scarfing blade 23, and the cutting of tube 24 by cutting blade 22. Scarfing blade 23 moves over die jaw 28, and should binding occur between scarfing blade 23 and tube 24 a force is generated tending to pull die jaw 28 towards the left as illustrated in FIG. 1. As will be explained below, die jaw 28 is associated with a right cam follower 50, as illustrated in FIG. 1, while an overload biasing assembly 47 of this invention is associated with the left cam follower 49. Thus, the overload biasing force is not associated with the "scarfing blade" die jaw 28, but instead is associated with die jaw 30. Although scarfing blade 23 is disclosed "pulling" against die jaw to score tube 24, it should be understood that this invention would also cover arrangements wherein blade 23 "pushes" against a die jaw when scoring the tube, which would then be the "scarfing blade" die jaw.

Bolt 32 mounts die jaw 30 to first slide member 36, and bolt 38 mounts die jaw 28 to second slide member 39. Die jaw cam 40 having thin profile portion 42, outwardly ramped profile portion 44, and thick profile portion 46, is moved in concert with blade 22 to ensure proper timing between clamping by die set 26, scoring by blade 23 and cutting by blade 22. Die jaw cam 40 is disposed between first slide member 36 and second slide member 39 and moves the two slide members from the clamping position illustrated in FIG. 1, to a non-clamping position at which the tube may freely move between die jaws 28 and 30. Blades 22 and 23, die set 26 and tube 24 are all moving linearly at the same speed when the clamping and cutting occurs. The general details of such tube cutting apparatus are well known in the art, and are disclosed in the above cited patents.

Overload assembly 47 provides an overload biasing force to eccentric shaft 48 which receives first roller 49 associated with first slide 36. Second roller 50 is associated with second slide 39. Rollers 49 and 50 are normally maintained in contact with die jaw cam 40 by a spring force, as will be explained below.

Eccentric shaft 48 is integral with a pivot arm 51 which has a downwardly extending lever arm 52. Pin 54 pivotally connects lever arm 52 to a biasing member, which is preferably piston 56 biased outwardly of gas spring 58. The gas spring is most preferably a nitrogen spring. It should be understood that other types of springs may be utilized. Gas spring 58 is pinned at 60 to first slide member 36 and provides a spring force to bias lever arm 52 counter-clockwise, as illustrated in FIG. 1. The spring force transmitted to lever arm 52 creates an overload biasing force, or torque, on eccentric 48 that is increased due to lever arm 52. The spring force is preferably applied generally perpendicular to the end of lever arm 52, to apply a maximum overload biasing force to maintain eccentric 48 and first roller 49 at a first rotational position. Lever arm 52 is illustrated extending vertically downwardly, but it should be understood that any relative orientation is within the scope of this invention. Since gas spring 58 is mounted on slide member 36, the spring force provided by piston 56 does not resist sliding movement of first slide member 36.

As can be seen from FIG. 2, first slide member 36 has channel 59 received on guide 62 of second slide member 39. Second slide member 39 is longer than first slide member 36 and slidably receives it.

Die jaw cam 40 is received between first roller 49 and second roller 50. When the thin profile portion 42 of die jaw cam 40 is received between rollers 49 and 50, the rollers are maintained relatively close to each other and die jaws 28 and 30 are removed from each other in the open position. When it is desired to clamp tube 24, die jaw cam 40 is moved vertically downwardly between rollers 49 and 50, and outwardly ramped profile portion 44 forces rollers 49 and 50 apart. As rollers 49 and 50 move apart, first slide member 36 and second slide member 39 slide relative to each other, and die jaws 28 and 30 move to engage tube 24 at a clamping position. As die jaw cam 40 continues to move downwardly, thick profile portion 46 is received between rollers 49 and 50 creating a clamping force holding die jaws 28 and 30 in clamping engagement with tube 24 while it is scored and cut by blades 23 and 22. Once tube 24 is cut, die jaw cam 40 is returned vertically upwardly such that thin profile portion 42 is received between rollers 49 and 50.

Roller 50 is mounted to shaft 68 having square mounting flange 77. Shaft 68 may be of a known type which can be eccentrically mounted at any of a plurality of rotational positions to adjust the distance between rollers 49 and 50.

As shown in FIG. 3, piston 56 and lever arm 52 define an included angle X, which is preferably approximately 90 degrees. Most preferably, angle X is slightly less than 90 degrees to apply the maximum overload biasing force as will be explained below. Angle X may also be adjusted to control the overload biasing force. It should be understood that although one feature of this invention is the decay of the overload biasing force, if angle X is slightly greater than 90 degrees the force will increase until angle X reaches 90 degrees. It will then begin to decay.

An effective length of the lever arm for purposes of calculating the torque is determined using included angle X. This effective length can be visualized by considering the component of spring force F applied perpendicular to lever arm 52, as opposed to the component of the spring force that is applied directly into lever arm 52. The component of spring force F applied perpendicular to lever arm 52 creates an overload biasing force T, or torque, at the opposed end of lever arm 52 which holds first roller 49 against die jaw cam 40. When the included angle is approximately 90 degrees the component that is perpendicular to the lever arm is the entire spring force. As the included angle increases towards 180 degrees, the component of the spring force that is perpendicular to lever arm 52 decreases towards zero.

An obstruction force as described above causes lever arm 52 to rotate in opposition to an overload biasing force T. If the obstruction force exceeds overload biasing force T, lever arm 52 rotates clockwise, as illustrated in FIG. 3. Piston 56 is forced into gas spring 58 and included angle X increases towards 180 degrees. As included angle X increases, the effective length of lever arm 52, or the component of spring force F perpendicular to lever arm 52 decrease, and the resulting overload biasing force T on first roller 49 also decreases. It then becomes easier for roller 49 and eccentric shaft 48 to rotate an additional amount. As eccentric shaft 48 rotates with first roller 49, the center of first roller 49 moves relative to the remainder of slide member 36, as will be explained below, to accommodate die jaw cam 40.

It should be understood that slide members 36 and 39 are only actually moved by die jaw cam 40 while outwardly ramped profile portion 44 is being moved between rollers 49 and 50. While either thin or thick profile portions 42, 46 are received between rollers 49 and 50 slide members 36 and 39 are not moving, and an obstruction force would not be placed upon roller 49. An obstruction force would only be expected during the short time period that outwardly ramped profile portion 44 is being moved between rollers 49 and 50 to move slide members 36 and 39, and associated die jaws 28 and 30 to their clamped positions. Thus, it is not necessary for first roller 49 to move a great distance relative to slide member 36 to accommodate die jaw cam 40, but only through a distance defined by the difference in width between thin profile portion 42 and thick profile portion 46.

As eccentric shaft 48, roller 49 and lever arm 52 rotate, they force piston 56 inwardly into gas spring 58. This may compress the gas within gas spring 58 and cause spring force F to increase. Spring force F would not increase to an extent such that it would eliminate the decarying effect of the force applied to roller 49 due to the changing effective lever arm. By selectively designing the strength of gas spring 58 the decay of the overload biasing force can be accurately controlled.

FIG. 4 is a partial cross-sectional view through tube cutting apparatus 20 and illustrates the movement of die jaw cam 40 between first roller 49 and second roller 50 to force the two apart. As is well known in the art, a biasing member, such as spring member 86 (shown schematically), may bias slide members 36 and 39 towards each other and into contact with die jaw cam 40. The outwardly ramped profile portion of die jaw cam 40 causes rollers 49 and 50 to move away from each other against the force of spring 86 and move die jaws 28 and 30 towards each other, in clamping engagement with tube 24.

Figure 6:
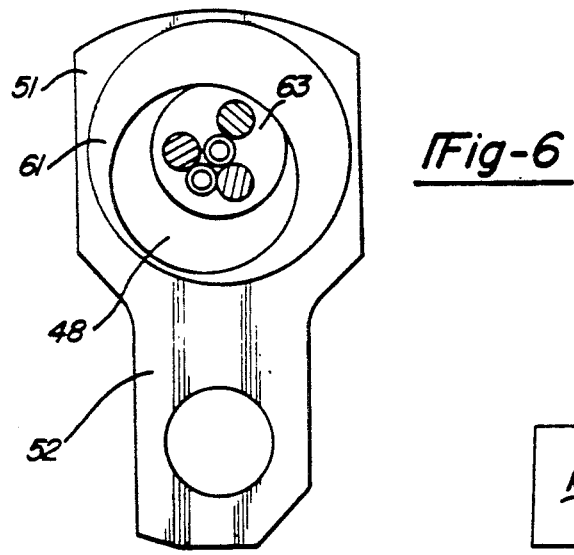
FIG. 6 is a partial cross-sectional view through the overload assembly of the present invention.

As shown in FIG. 5, pivot arm 51 includes enlarged portion 61 and lever arm 52 which receives pin 54. Eccentric shaft 48 receives first roller 49 and is centered vertically downwardly and toward die jaw cam 40 from the center of enlarged portion 61. An end 63 of pivot arm 51 receives bushing 80, which is connected to thrust plate 65. Needle bearings 82 and 84 receive bushing 80 and enlarged portion 61 to provide large diameter bearing surfaces on each side of roller 49 and eccentric shaft 48 to prevent bending. FIG. 6 is a partial cross-sectional view of pivot arm 51. Roller 49 is not illustrated such that the other details of the arrangement are visible. Eccentric shaft 48 is initially centered at an axis lower than the center axis of enlarged portion 61 and also removed towards the left from the center of enlarged portion 61, as shown in this figure. This is in a direction toward die jaw cam 40. Roller 49 and eccentric shaft 48 will rotate counter-clockwise as shown in this figure due to an obstruction force. As eccentric shaft 48 rotates, its center moves towards the right, as shown in this figure, and roller 49 moves along with it to accommodate die jaw cam 40.

Figure 7:
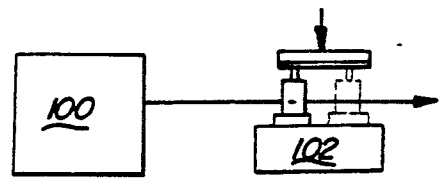
FIG. 7 is a schematic view of a tubing system according to the present invention.

FIG. 7 is a schematic view of a tube forming system incorporating the details of the present invention. Tubing mill 100 forms tubing which then moves downstream to be cut by cutting apparatus 102. Cutting apparatus 102 includes the blades, clamp apparatus and cam described in this application.

Although the invention has been disclosed in a moving tube cutting apparatus with specific jaw structure, it should be understood that the invention is not limited to moving tube cutting apparatus, nor to any specific jaw structure. Instead, the invention may extent to any clamping application and structure.

A preferred embodiment of the present invention has been disclosed; however, those skilled in the art will realize that certain modifications would come within the scope of the present invention, and thus the following claims should be studied to determine the true scope and content of the present invention.

I claim:

1. A clamp comprising:
    a first jaw slidable towards a second jaw to a first clamped position at which said first and second jaws are relatively adjacent to each other, at least said first jaw being slidable away from said second jaw to a second open position at which said jaws are relatively separated from each other;
    said first jaw having a cam follower, a cam contacting said cam follower and causing movement of said first jaw towards said second jaw; and
    means for applying an overload biasing force to said cam follower to bias said cam follower into said cam, an obstruction to movement of said first and second jaws towards each other creating an obstruction force in opposite to said overload biasing force, said obstruction force moving said cam follower relative to said first jaw to accommodate said cam if said obstruction force exceeds said overload biasing force, and preventing further movement of said first jaw, said means for applying an overload biasing force being constructed such that it moves from an initial position when said obstruction force exceeds said overload biasing force towards a position where said overload biasing force decays to lower values after having been exceeded by said obstruction force, and said means for applying an overload biasing force thereafter returning to said initial position to restore said overload biasing force.

2. A clamp as recited in claim 1, wherein said cam follower is a roller.

3. A clamp as recited in claim 2, wherein both said first and second jaws have rollers in contact with said cam.

4. A clamp as recited in claim 3, wherein said means for applying an overload biasing force applies an overload biasing force only to said roller of said first jaw.

5. A clamp as recited in claim 1, wherein said means for applying an overload biasing force include a biasing member attached to said first jaw, said biasing member being attached to said cam follower through a lever arm, said biasing member applying a spring force to said lever arm.

6. A clamp as recited in claim 5, wherein said cam follower on said first jaw is a roller, said roller being mounted on an eccentric shaft initially offset towards said cam.

7. A clamp as recited in claim 6, wherein said lever arm is rotationally mounted in bearings on both axial sides of said roller.

8. A clamp as recited in claim 5, wherein said biasing member is pinned to said lever arm and an included angle is defined between said biasing member and said lever arm, said included angle being approximately 90 degrees at the point before said obstruction force exceeds said overload biasing force, said included angle approaching 180 degrees as said cam follower moves to accommodate said cam after said overload biasing force is initially exceeded.

9. A clamp as recited in claim 8, wherein said biasing member is a piston of a gas spring.

10. A clamp as recited a claim 5, wherein said biasing member is a piston of a gas spring.

11. An apparatus for forming and cutting tubing comprising:
   a tube mill;
   a clamping assembly downstream of said tube mill, said clamping assembly including a cutting blade, a jaw set, and a cam;
   said jaw set clamping a tube as the tube is cut by said cutting blade;
   said cam causing said jaw set to move and clamp the tube; and
   said jaw set including an overload assembly, said overload assembly allowing at least a portion of said jaw set to stop moving due to said cam when an obstruction is encountered, said overload assembly applying an overload biasing force of a first level normally causing said jaw set to continue moving due to said cam, said overload biasing force being exceeded by a sufficient obstruction force such that at least a portion of said jaw set no longer moves due to said cam, said means for applying an overload biasing force being constructed such that it moves from an initial position when said obstruction force exceeds said overload biasing force to a position where said overload biasing force to levels lower than said first level after having been exceeded by said obstruction force and said means for applying an overload biasing force thereafter returning to said initial position to restore said overload biasing force.

12. An apparatus as recited in claim 11, wherein said jaw set comprises a first jaw and a second jaw, said first and second jaws being slidable towards each other to a first clamped position, and slidable away from each other to a second opened position, said jaws each having a cam follower, said cam contacting said cam followers and causing movement of said jaws towards and away from each other.

13. An apparatus as recited in claim 12, wherein said overload assembly includes a biasing member attached to said cam follower of said first jaw through a lever arm, said biasing member applying a spring force to said lever arm, said first jaw being the portion of said jaw set which no longer moves.

14. An apparatus as recited in claim 13, wherein said cam follower on said first jaw is a roller, said roller being mounted on an eccentric shaft initially offset towards said cam.

15. An apparatus as recited in claim 13, wherein said biasing member is pinned to said lever arm and an included angle is defined between said biasing member and said lever arm, said included angle initially being approximately 90 degrees at a point before said obstruction force exceeds said overload biasing force, said included angle approaching 180 degrees as said cam follower moves to accommodate said cam after said overload biasing force is initially exceeded.

16. An apparatus as recited in claim 15, wherein said initial included angle is slightly less than 90 degrees.

17. An apparatus as recited in claim 16, wherein said cam follower on said first jaw is a roller, said roller being mounted on an eccentric shaft initially offset towards said cam.

18. An apparatus as recited in claim 12, wherein said clamping assembly further includes a scarfing blade which scores the tube prior to cutting by said cutting blade, said overload assembly applies a biasing force to said first jaw, and said scarfing blade moves over said second jaw such that any binding between said scarfing blade and a tube will cause a force tending to pull said second jaw out of engagement with a tube.

19. An apparatus for forming and cutting tubing comprising:
   a tube mill;
   a clamping assembly downstream from said tube mill, said clamping assembly including a cutting blade, a scarfing blade, a jaw set and a cam;
   said cam causing said jaw set to move and clamp a tube, said scarfing blade moving to score a surface of a tube, the tube then being cut by said cutting blade; and
   said jaw set comprising a first jaw and a second jaw slidable towards each other to a first clamped position, and slidable away from each other to a second open position, said first jaw having a cam follower, said cam contacting said cam follower and causing movement of said jaws towards and away from each other, said scarfing blade moving parallel to the movement of said jaws and toward said second jaw to score a tube, said jaw set further including an overload assembly which applies a overload biasing force to said first jaw, said first jaw cam follower moving relative to said first jaw should a force between said cam follower and said cam exceed said overload biasing force such that said cam no longer causes said first jaw to move.

20. An apparatus as recited in claim 19, wherein, said overload biasing force eventually decays to lower values after having been exceeded.

21. An apparatus as recited in claim 19, wherein said scarfing blade is pulled over said second jaw to score a tube.

22. A clamp comprising:
   a first jaw slidable towards a second jaw to a first clamped position at which said first and second jaws are relatively to adjacent to each other, at least said first jaw being slidable away from said second jaw to a second open position at which said jaws are relatively separated from each other;
   said first jaw having a cam follower, a cam contacting said cam follower and causing movement of said first jaw towards said second jaw;
   means for applying an overload biasing force to said cam follower to bias said cam follower into said cam, an obstruction to movement of said first and second jaws towards each other creating an obstructin force in opposition to said overload biasing force, said obstruction force moving said cam follower relative to said first jaw to accommodate said cam if said obstruction force exceeds said overload biasing force, and preventing further movement to said first jaw, said overload biasing force eventually decaying to lower values after having been exceeded by said obstruction force; and said cam means for applying an overload biasing force include a biasing member attached to said first jaw, said biasing member being attached to said cam follower through a lever arm, said biasing member applying a spring force to said lever arm.

23. An apparatus for forming and cutting tubing comprising:

a tube mill:

a clamping assembly downstream of said tube mill, said clamping assembly including a cutting blade, a jaw set, and a cam;

said jaw set clamping a tube as the tube is cut by said cutting blade;

said cam causing said jaw set to move and clamp the tube;

said jaw set including an overlad assembly, said overload assembly allowing at least a portion of said jaw set to stop moving due to said cam when an obstruction is encountered, said overload assembly applying an overload biasing force of a first level normally causing said jaw set to continue moving due to said cam, said overload biasing force being exceeded by a sufficient obstruction force such that at least a portion of said jaw set no longer moves due to said cam, and said overload biasing force eventually decaying to levels lower than said first level after having an exceeded by said obstruction force;

said jaw set comprises a first jaw and a second jaw, said first and second jaws being slidable towards each other to a first clamped position, and slidable away from each other to a second opened position, said jaws each having a cam follower, said cam contacting said cam followers and causing movement of said jaws towards and away from each other; and said overload assembly includes a biasing member attached to said cam follower of said first jaw through a lever arm, said biasing member applying a spring foce to said lever arm, said first jaw being the portion of said jaw set which no longer moves.

* * * * *